(12) United States Patent
Berná Fornies et al.

(10) Patent No.: US 8,780,894 B2
(45) Date of Patent: Jul. 15, 2014

(54) SYSTEM ENABLING IP (INTERNET PROTOCOL) SERVICES FOR USER TERMINAL BASED ON SIP (SESSION INITIATION PROTOCOL) SIGNALING

(75) Inventors: Hector Berná Fornies, Zaragoza (ES); José Carlos Sendra Alcina, Madrid (ES); Tomás Francisco Fernandez Alonso, Madrid (ES); Santiago Gimeno Valer, Zaragoza (ES); Jesús David Monzón Legido, Zaragoza (ES)

(73) Assignee: VODAFONE Group PLC, Berkshire (GB)

( * ) Notice: Subject to any disclaimer, the term of this patent is extended or adjusted under 35 U.S.C. 154(b) by 1477 days.

(21) Appl. No.: 11/586,144

(22) Filed: Oct. 25, 2006

(65) Prior Publication Data

US 2007/0201452 A1    Aug. 30, 2007

(30) Foreign Application Priority Data

Oct. 26, 2005    (ES) .................................. 200502609

(51) Int. Cl.
*H04L 12/66*    (2006.01)

(52) U.S. Cl.
USPC .......................................................... 370/356

(58) Field of Classification Search
None
See application file for complete search history.

(56) References Cited

U.S. PATENT DOCUMENTS 7,643,626 B2 *    1/2010    Haase et al. ............. 379/201.03
2004/0193700 A1 *    9/2004    Westman et al. ............. 709/219
2007/0088836 A1 *    4/2007    Tai et al. ....................... 709/227
2007/0100981 A1 *    5/2007    Adamczyk et al. ........... 709/223

FOREIGN PATENT DOCUMENTS

| WO | 0147213 A1 | 6/2001 |
|---|---|---|
| WO | WO 2004/003725 A1 | 1/2004 |
| WO | 2004040777 A2 | 5/2004 |
| WO | WO 2004/040777 A2 | 5/2004 |
| WO | 2005027459 A1 | 3/2005 |

OTHER PUBLICATIONS

Schulke et al. "Creating New Communication Services Efficiently." *NEC J. of Adv. Tech.* vol. 2, No. 2. Mar. 2005. pp. 170-178.
OMA "Utilization of IMS capabilities Architecture." *Open Mobile Alliance.* Aug. 2005.—Whole document.
Search report from the Spanish Patent Office for Application No. 2 273 603, Oct. 26, 2005, 1 page.

* cited by examiner

*Primary Examiner* — Jae Y Lee
*Assistant Examiner* — Alan Lindenbaum
(74) *Attorney, Agent, or Firm* — Merchant & Gould P.C.

(57) ABSTRACT

The invention relates to a system enabling IP (internet protocol) services for user terminals based on SIP (session initiation protocol) signaling applicable in fixed and mobile terminals (1) of user (2) provided with means of access to an IP network (5) connected to an IMS network (6) communicating with other terminals (1) of user (2) or other services (3). It comprises a communications interface (15) connecting an application processor (7) with at least one access module (26-34) connected to an SIP signaling module (10) for the interaction of the application processor (7) by means of events with other terminals (1) of user (2) and with services (3). It comprises an event dispatcher module (19) receiving the produced events and in which the processor (7) loads filtration criteria of the events required by each application, to send each received event to the applications (8) requiring it.

7 Claims, 2 Drawing Sheets

SYSTEM ENABLING IP (INTERNET PROTOCOL) SERVICES FOR USER TERMINAL BASED ON SIP (SESSION INITIATION PROTOCOL) SIGNALING

OBJECTS OF THE INVENTION

The invention is provided to allow the common access by several applications to the services provided in an IMS (Internet Multimedia Subsystem) network and the combination of the execution of said applications from fixed and mobile user terminals.

The invention also provides the possibility of dynamically activating IP services in user devices and of permanent access thereto.

The invention further allows the use of services in the IMS network that were initially conceived for working in the IP network and vice versa, i.e., it also allows using services in the IP network that were initially conceived for working in the IMS network, such that it allows access from Internet to IMS services.

The invention is applicable both in fixed user terminals and in mobile user terminals which are provided with means of access to an IP network which communicates with other user terminals or other services through an IMS network.

BACKGROUND OF THE INVENTION

The use of IP networks the services of which have been defined by IETF (Internet Engineering Task Force, which is the organization in charge of protocol engineering and the division for Internet development) is very well known, such that the specifications have evolved throughout the years only paying attention to the specific needs that each of these services solved at each time.

On the other hand, the frequently named IMS (Internet Multimedia Subsystem) network services specified by 3GPP (Third Generation Partnership Project) which is the organization producing the technical specifications for third generation mobile systems based on GSM (Global System for Mobile Communications) networks, has selected the SIP protocol which is the protocol developed by IETF for the world of Internet, therefore, 3GPP has created more complementary specifications to SIP in order to be able to access multimedia services in the mobile communications environment (cellular telephony, Wi-Fi, Bluetooth).

The mobile world has recently joined the world of Internet, therefore, many services of fixed Internet networks were not conceived to work in the new environment of the mobile world.

Currently, with the recent implementation of third generation mobile networks with wider bandwidth, the possibility of incorporating multimedia services (video conferences, multiplayer games, etc.) to mobile telephony has opened up.

Therefore, mobile terminals must incorporate an SIP signaling module in order to access the services provided by IMS. In addition to cellular devices, any other type of duly configured device with access to the IP network will also be able to access the services offered by IMS.

The current architectures of user terminals with access to IP networks incorporate an SIP signaling module which allows them to access the different services. Each application incorporated in the terminal has to access the SIP module directly and a record and access to these services has to be implemented. In this way, each similar application implements the same functionality separately. Furthermore, as each application has to interact directly with the SIP module of the terminal, it is not possible to have several applications being executed at the same time in the same device because they come into conflict. The present invention solves this problem by providing the user terminals with an enabling system which is connected with the SIP module allowing the common access to services and further allowing the combination of the execution of several applications in the same user terminal using the same resources.

In the field of IMS networks provided for the access to multimedia services in the mobile communications environment, patent document WO 2004/040777 must be mentioned, which describes improvements of the architecture proposed by 3GPP for user terminals in an IMS environment describing the signaling level, but unlike the invention, it does not describe the service application level.

DESCRIPTION OF THE INVENTION

In order to solve and achieve the objectives indicated above, the invention provides a system enabling IP services for user terminals based on SIP signaling which is provided for its application in fixed and mobile user terminals which, like the conventional ones, incorporate means of access to an IP network communicating with other user terminals or other services through an IMS network, such that the terminals comprise an SIP signaling module to allow carrying out user agent client and server functions according to RFC (Request for Comments) 3261 and according to the specifications proposed by 3GPP; and the terminals including a processor of a plurality of applications and an input/output interface for interaction of the user with the terminal; as well as an ISIM (IP Multimedia Services Identity Module) module for storing the public and private identities of the user of the terminal; and a content specific protocol module interacting with the application processor by exchanging content.

The invention has the novelty of comprising a communication interface connecting the application processor with at least one access module which is connected in turn to the SIP signaling module; the access module comprising means for processing the actions from the application processor and means for sending events to an event dispatcher and interacting with the SIP signaling module; all of this to allow the interaction of the application processor by means of events with other user terminals and with services connected to an IMS network through the IP and IMS networks. The event dispatcher receives the produced events and is provided so that the application processor loads therein, through the communication interface, filtration criteria of the events required for each application provided in the application processor; such that from the filtration criteria it sends each received event to the applications requiring it. The system further comprises a content manager connected to the specific protocol module for exchanging events between an application of the application processor and the applications of other user terminals and services; and it includes a profile manager connected to the ISM module for the management of public and private identities of the user of the terminal and the sending of events by the event dispatcher to each application of the application processor according to the identity associated to each event.

The communication interface is characterized in that it comprises a subscription/cancellation module for subscribing/canceling applications to events connected to the event dispatcher such that each of the applications included in the application processor subscribes to the events it wants to receive. The communications interface is further characterized in that it comprise an event notifying module sending each occurred event to each application subscribed to each event; and the communications interface including an action sending module in order to allow the application processor to request the processing of an action by at least the access module or by a manager, therefore the action is univocally directed to an access module or to a manager known in advance, which prevents the incorporation of an action dispatcher as occurred in the case of the event dispatcher, a case in which each event is required to be sent to the applications needing it.

The filtration criteria are included in each application and so that each application of the application processor receives the required event, it is envisaged that the application processor is able to process the filtration criteria provided by each application in the subscription and generate a filtration criterion for the subscription to each event required by each application, such that each filtration criterion comprises at least one identification of the application, a user profile, a priority and optionally a trigger point. The user profile includes the public identity of the user, and the trigger point includes from one to n service point triggers indicating the triggers produced by each event; where n is a positive integer. Therefore, the filtration criterion indicates the conditions that each event must fulfill in order to be sent to one or more applications.

With respect to the event dispatcher module, the latter is characterized in that it comprises a filtration criteria loading/unloading submodule receiving the criteria through the subscription/cancellation module of the communications interface such that it registers the subscription/cancellation of the applications to the events that each of these applications requires; and comprises a storage submodule for storing the received filtration criteria, which groups the filtration criteria subsets having the same user profile in common and arranges them with priorities; further having a filtration logic submodule receiving the events; which in turn comprise at least one user profile and service point triggers so that the filtration logic submodule processes the event and checks which trigger points are comprised by the event filtration criteria according to the order of priority and within its filtration criteria group assigned by the user profile; and including a distributor module connected to the event notifying module of the communication interface, to send the events to each application fulfilling the filtration criteria.

Therefore, once the filtration logic receives the event, it requests the filtration code subset for that event, looks for the service point triggers in the event, checks the trigger point, and in the event of fulfilling the conditions of the filtration criteria, it passes the event to the distributor module. In the event of not fulfilling the condition, the process is repeated with the following filtration criteria with a lower priority. If at the end, the event does not fulfill any condition, it is discarded.

The system of the invention envisages that there cannot be two filtration criteria with the same priority for a single user profile, and in the case of the absence of trigger points in the filtration criteria, the unconditional sending of the event to the application subscribed to that event is carried out.

The preferred embodiment of the invention envisages the incorporation of a plurality of access modules, such as a registration module for registering applications to IMS and IP networks to carry out the registration, deregistration and request of contacts associated to one or more identities of the user; a call generating module for calling IP and IMS networks for the access of the application processor to the latter; an event registration module for an IMS network for the access of the application processor to the events of said IMS network; a presence module for the access of the application processor to presence services; an instant messaging module for the access of the application processor to the sending and receiving of messages both inside and outside a session; a capacity requesting module for requesting the capacity of different nodes within an SIP signaling network for the access of the application processor to this type of requests; a call information sending module for the access of the application processor to this functionality; or a service transfer module, for transferring a service such as a call, for the access of the application processor to this function.

The preferred embodiment of the invention further envisages the incorporation of at least one generic module for extending the system functionality as the functionality of the SIP signaling module is extended.

The aforementioned access modules can be incorporated according to different combinations according to the needs required by the user terminals.

Like the rest of the access modules, the generic module is able to process actions sent by the application and send events to the event dispatcher as well as interact with the SIP module.

A series of drawings in which the object of the invention has been represented with an illustrative and non-limiting character is attached in order to facilitate a better understanding of this specification and forming an integral part thereof.

DESCRIPTION OF THE PREFERRED EMBODIMENT

Figure 1:
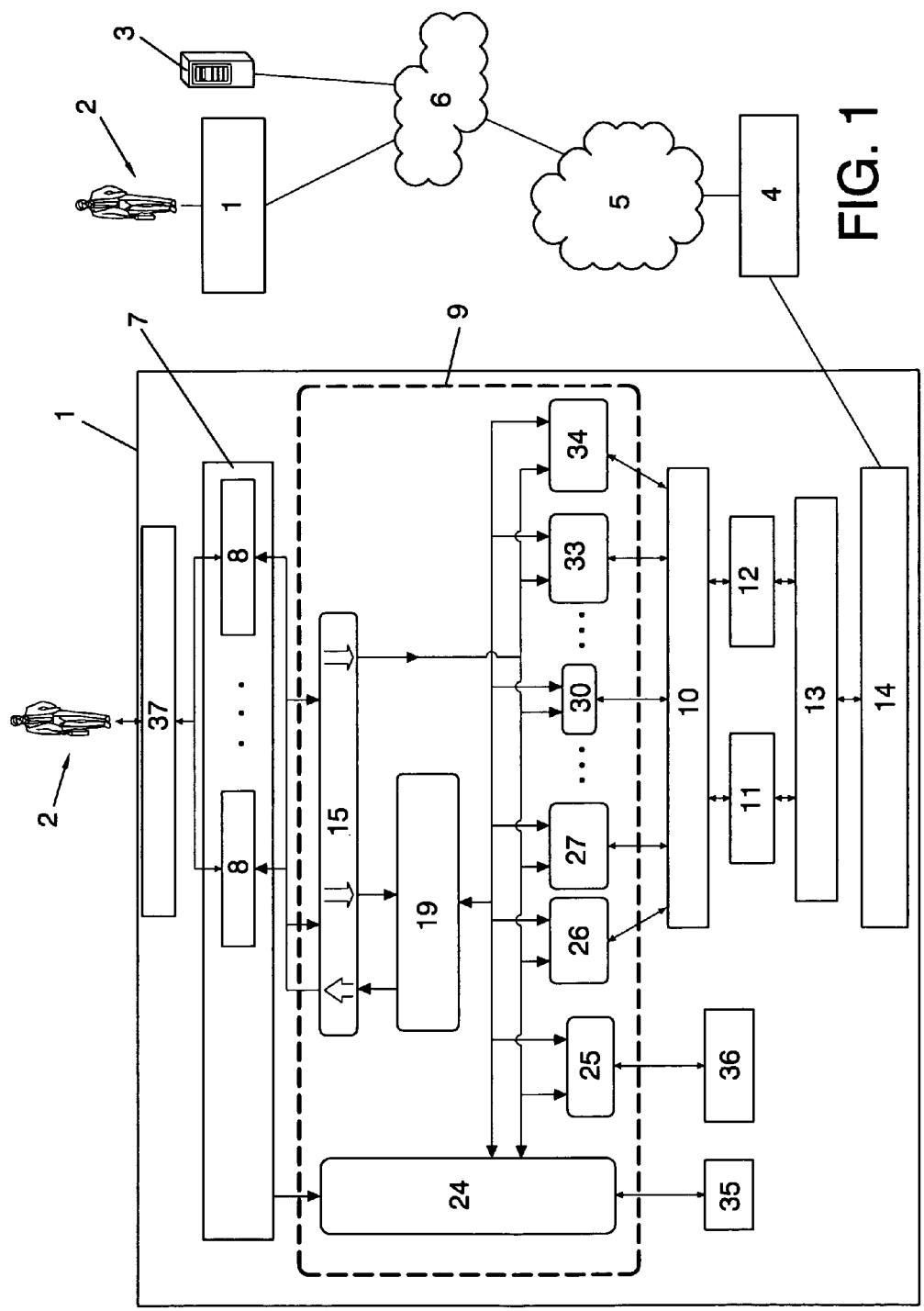
FIG. 1 shows a functional block diagram of an embodiment of the system of the invention.
Figure 2:
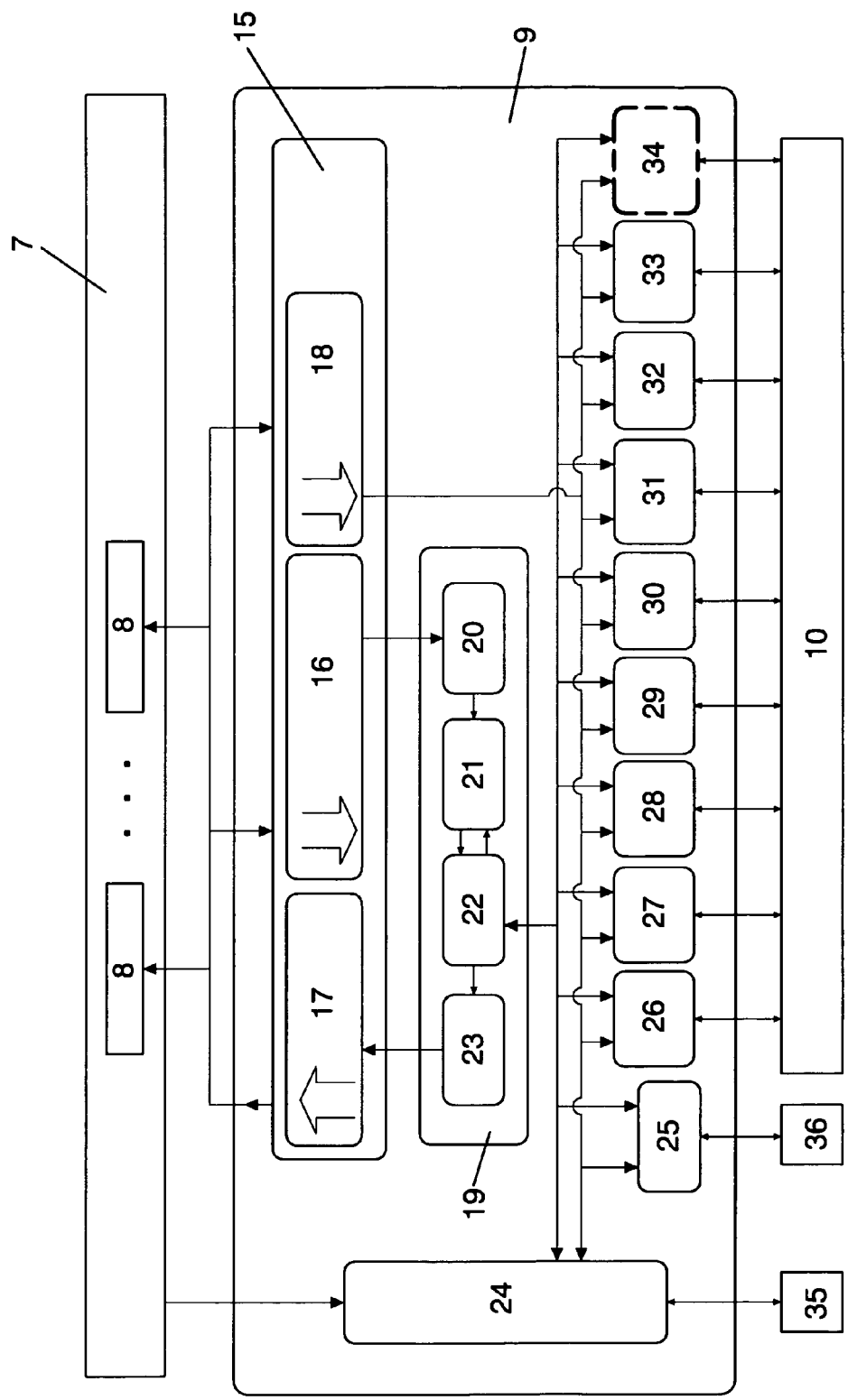
FIG. 2 shows a functional block diagram of the configuration of the communications interface and of the event dispatcher, as well as the connection carried out therebetween and with the managers and the access modules.

A description of the invention based on the aforementioned figures is carried out below.

The invention relates to an enabler 9 which is applied in fixed or mobile terminals 1 of user 2 and which communicates with other terminals 1 of user 2 or other services 3 by means of an interface 4 through an IMS network 6 and an IP network 5.

Terminal 1 comprises an application processor 7 including a plurality of applications 8 which by means of a data input/output module 37 allows the interaction of the user 2 with the terminal 1 and with the functionalities offered by the applications 8.

In order for terminal 1 to establish communication with the interface 4, each terminal 1 is provided with an SIP signaling module 10 connecting with an IP (Internet protocol) module 10 through a TCP (transmission control protocol) module 11 and a UDP (user datagram protocol) module 12 and all this such that the IP module 13 is connected to a network access module 14 through which communication is established with the access interface 4 for accessing the IP network 5.

The network access module 14 handles any type of protocol such as for example GPRS (General Packet Radio Service), UMTS (Universal Mobile Telecommunications System), Wi-Fi, Bluetooth, Internet, xDSL to allow the handling of both mobile and fixed terminals 1.

In order to carry out the connection of the enabler 9 with the application processor, the former comprises a communications interface 15 which is connected with a plurality of access modules 26 to 34, with a profile manager 24 and a content manager 25, this connection being carried out directly and also through an event dispatcher 19.

The content manager 25 is connected to a content specific protocol module 36 and the profile manager 24 is connected to an ISIM module 35 ((IMS (Internet multimedia system) SIM (subscriber identity module)) of those conventionally used in terminals 1 and the functionality of which will be explained later.

Access modules 26 to 34 form the means for connecting the enabler 9 to the SIP signaling module 10 from which the communication with network access interface 4 by means of the modules 11 or 12, 13 and 14 is allowed.

The SIP signaling module is conventional and provides a protocol for initiating interactive multimedia sessions between users of IP networks and once a session is established, other content protocols become involved such as RTP (real time protocol), TCP (transmission control protocol), HTTP (hypertext transfer protocol).

The application processor 7 can request the processing of an action by an access module 26 to 34 or by a manager 24, 25, such that the communication interface has an action sending module 18 which sends an action univocally to one of the access modules or to one of the managers. For example, it can request the action of "initiate call", such that the module 18 generates a signal invoking the action of "initiate call" to one of the access modules, specifically to a calling module 27 which initiates the requested call through the SIP signaling module 10.

On the other hand, the events reaching terminal 1 through the IP network 5, pass from the SIP signaling module 10 to the corresponding access module 26 to 34, which will be described later, for their sending to the application processor 7. To that end, each of the applications 8 of the application processor 7 must subscribe to each one of the events it wants to receive in the manner described below. In order to be able to carry out this function, each application includes a filtration criterion which it delivers to the application processor which processes the filtration criteria provided by each application and generates a filtration criterion.

In order to carry out the subscription of each application to the different events it wants to receive, it is envisaged that the communication interface 15 comprises a subscription/cancellation module 16 for subscribing/canceling applications to events, which is connected to the application processor 7, which generates the filtration criterion for the subscription of each application 8 to each one of the events they require as explained previously, such that, the subscription of the applications 8 to the events they wish to receive is carried out from the filtration criteria through the module 16.

Each one of the events, among other information, comprises information corresponding to a user profile formed by its public identity, and service point triggers indicating the SIP signaling point which may cause the user device module 10 to send an SIP message to one of the applications as will be described.

Each one of the filtration criteria comprises information regarding the user profile formed by the public identity of the user, a trigger point representing the conditions in which each application wishes to receive the required event, conditions which are formed by a set of triggers which must be checked in order to contact the application or not, each trigger point having 1 to n service point triggers, where n is an integer. The filtration criterion further incorporates a priority and a reference to the application to which each event must be sent.

The events include information regarding a user profile and service point triggers to verify the stored filtration criteria, and to verify to which application each event must be sent as will be described.

The subscription/cancellation module 16 of the communication interface 15 is connected to a filtration criteria loading/unloading submodule 20, which filtration criteria are generated by the application processor 7, which is included in the event dispatcher module 19.

The filtration criteria loading/unloading module 20 is connected to a filtration criteria storage submodule 21 included in the event dispatcher module 19 itself in which the filtration criteria are grouped according to the user profiles, as many filtration criteria subsets being established as user profiles exist. Furthermore, the submodule 21 arranges all the filtration criteria subsets according to their priorities, taking into account that the lower the priority number, the sooner the filtration criterion will be evaluated, i.e. a filtration criterion with a higher priority number must be evaluated after a filtration criterion with a lower priority number, such that submodule 21 has filtration criteria arranged first by the user profile and then by the established priority.

The event dispatcher module 19 further comprises a filtration logic submodule 22 which is connected to the filtration criteria storage submodule 21 such that the events received by the managers 24, 25 or the access modules 26 to 34 are sent to the submodule 22 which the filtration criteria subset requests from the submodule 21 for the received event and then it looks for the identification of the user profile included in the event and fixes the filtration criteria subset, which criteria will be checked for that event according to the identity of the user. If there is no filtration criteria subset for the user profile of the event, the process ends until the arrival of a new event. If there is any filtration criteria associated to the identity of the user, it then looks for service point triggers included in the event and checks the trigger point of the filtration criterion with greater priority according to the service point triggers of the event. In the event of fulfilling the condition of the filtration criterion, the event is passed to a distributor submodule 23 included in the event dispatcher 19 by means of which the event is sent to the application the filtration criterion of which has been fulfilled.

If the condition of the filtration criterion is not fulfilled, the process is repeated with the following filtration criteria with lower priority. If at the end the event does not fulfill any condition, it is discarded.

When the event is sent to the application, it must be verified if the sending of the event is of a single type, in which case the process ends when the latter is sent, and in the event that the sending of the event is of a multiple type, the remaining filtration criteria of the subset associated to each user profile are checked until there is none left, the event being sent to each one of the applications the filtration criterion of which is fulfilled.

The distributor submodule 23 of the event dispatcher 19 is connected to an event notifier 17 included in the communication interface 15 by means of which the event is notified to each one of the applications requiring it, therefore the events have to fulfill the filtration criterion generated by the application processor 7 for each one of said applications 8.

By means of the subscription/cancellation module 16 of the communication interface 15, the application processor 7 can also cancel the events when required by canceling the previously loaded filtration criteria.

The filtration logic submodule 22 processes all the requests from the SIP signaling module 10 coming into the enabler 9. If the attempt is made to subscribe to an application with the same priority as another application for a single user profile, a subscription error is generated and the subscription must be carried out with a different priority.

It is possible that the filtration criterion lacks a trigger point, in which case it indicates the unconditional sending of the event to the application.

Each trigger point is a Boolean expression in a conjunctive (CNF) or disjunctive (DNF) form.

The access modules are the ones deciding what type of single or multiple notification must be carried out by the dispatcher for each event.

The different identities of the user profiles are stored in the module 35 which is accessed through the profile manager 24 which is in charge of providing the identity of the user to access modules 26 to 34 needing it.

The private identity is used in the IMS network for purposes of authentication, authorization, administration and billing. In the case of the enabler 9, the private identity is used in the register according to the AKA (Authentication and Key Agreement) process. In the case of the invention, the profile manager 24 will only provide the private identity to one of the access modules, more specifically the registration module 26.

The public identity is used in the IMS network so that the user communicates with other users. In the case of the invention, the public identity is used by all the access modules 26 to 34 since all of them involve communication with other external users and services.

The profile manager 24 allows accessing the state of the public identities of the user, for example consulting whether an identity has also already been registered in the network, and to other parameters associated to that identity. The invention further envisages that the applications can access this manager directly without using the communication interface 7 since the handling of the identities is basic.

The content manager 25 is in charge of everything regarding the exchange of content established between the application 8 and the remote user service or application. The content manager does not understand the specific content, but it orders the start and the end of the transfer of the content, and also reports the IP address and the destination port to the content specific protocol module 36 so as to allow establishing the communication.

Depending on the user application, the content specific protocol module 36 interacts with other user applications by exchanging content, for example, it can be the real time protocol for voice and video exchange in real time.

The different access modules 26-34 included in the enabler 9 are described below.

As indicated previously, the registration module 26 is within the access modules, which module is provided so as to allow the application 8 to register in both IP networks and IMS networks. This functionality includes the registration, deregistration, refresh deregistration and request of contacts associated to a recording address of the IP network or to an IMS private identity.

A calling module 27 allows an application 8 to carry out calls both to the IP networks and to the IMS networks, to renegotiate the mean associated to the calls and the ending of calls.

A registration-event module is provided so that an application can access the functionality associated to the subscription to the event within an IMS network.

A presence module 29 allows an application 8 to carry out the subscription, re-subscription, de-subscription to the presence state publication presence service.

An instant messaging module 30 allows an application 8 to access instant messages, therefore it envisages the sending and receiving of messages both inside and outside the session.

A capacity requesting module 31 allows an application 8 to carry out the request of capacities of different nodes within a network using SIP signaling.

A call information sending module 32 is provided to allow an application 8 to access the sending of information associated to an ongoing call or session.

The invention further envisages a generic module for extending the system functionality as the functionality of the SIP signaling module 10 is extended according to future needs. It is possible to incorporate a variable number of generic modules according to the evolution of the applications.

The service transfer module 33 allows an application 8 to carry out the transfer of calls.

An example of the system operation is described below.

For example, the application processor 7 may comprise two applications 8. A first chat application which is an instant messaging application for contacting with users of a certain domain, the application having a certain identifier, and a second game application which is a game application in the network for users with a certain domain, and the application having a certain identifier.

In this case the applications are distinguished by the domain of the users, i.e., the chat application is provided for contacting with users of a domain and the game application is provided for contacting with users of another domain different from that of the chat application.

The game application wishes to be notified for all the types of events from or directed to the domain assigned to the games. The public identity of the filtration criterion for each one of the applications is the same in this case.

The filtration criterion establishes that the priority assigned to the chat application is zero since the latter has a greater priority than the game application.

Both the applications have to register the user in the IMS network 6 and know all the changes in the state of the user profile that are notified by the network by means of registration-event events.

In this example, the two applications 8 must first be subscribed to in the subscription/cancellation module 16 of the communication interface indicating the filtration criteria established for each one of the applications, criteria containing the user profile, the conditions formed by the trigger point, the priority and the identifier of the application. Then, the filtration criteria are arranged in the manner which was previously explained, taking into account that the chat application has more priority than the game application.

In this situation, when a series of events are generated that must be distributed among the applications 8, a session initiation signal will first reach the terminal the content of which is the description of the session destined to the user from a remote user who has generated a game application, for example. The event reaches the SIP signaling module 10 and it is delivered to the calling module 27 in which the event is processed and is passed to the content manager 25 to manage the description of the session with the specific content of the game which will be described in the body of the session initiation message. When the content manager 25 has ordered the start and the end of the transfer of the content, it returns the event to the calling module 27, which module sends it to the filtration logic submodule 22 included in the event dispatcher module 19, the trigger points being checked for the filtration criterion of the chat application since it is the one with a lower priority in the previously described manner, such that as in this case it does not satisfy any trigger point since it is a game application, the dispatcher continues with the following filtration criterion which is the one of the game application, the criterion of which is satisfied, therefore the event is dispatched to the game application 8. If this type of event is a single type (non-multiple), the dispatch of this event would end at this point.

In this same example, if it is assumed that another event belonging to an instant message corresponding to a text message is received, this will be received by the instant messaging module 30 through the SIP signaling module 10 to carry out its processing. In this event, the event is not passed to the content manager 25 since the content of the message is a text message in which the recipient is the application of the user. Therefore, in this case, the event is sent directly to the filtration logic submodule 22 and checks the trigger points for the filtration criteria of the chat application which is the one with a lower priority. As in this case the event satisfies the trigger point of the filtration criteria of the chat application, the distributor submodule 23 sends it to the identified chat application.

The invention claimed is:

1. A system enabling IP (Internet Protocol) services for user terminals based on SIP (Session Initiation Protocol) signaling, applicable in fixed and mobile user terminals accessible to an IP (Internet Protocol) network communicating with at least one of: (i) the other fixed and mobile user terminals and (ii) services, through an IMS (Internet Multimedia Subsystem) network, such that the fixed and mobile user terminals comprise an SIP signaling module so as to allow carrying out user agent client and server functions; the fixed and mobile user terminals comprising:

an application processor processing a plurality of applications, each application including one or more filtration criteria used by the application processor to subscribe the application to events required by the application, the one or more filtration criteria being evaluated according to an order of priority associated with the filtration criteria;

an input/output interface for interaction of the user with one of the fixed and mobile user terminals;

an ISIM (IP Multimedia Services Identity Module) that stores at least one of public and private identities of the user of the one of the fixed and mobile user terminals;

an enabler module connected to, and arranged between, the application processor and the SIP signaling module to direct requests between the SIP signaling module and the applications of the application processor, wherein the enabler module comprises:

a communications interface;

at least one access module connected to, and arranged between the SIP signaling module and the communications interface, wherein the at least one access module is configured to receive outgoing requests from the application processor through at least the communications interface and send the outgoing requests to the SIP signaling module, and is also configured to receive incoming requests from the SIP signaling module; and an event dispatcher module connected to, and arranged between, the at least one access module and the communications interface, wherein the event dispatcher module is arranged and configured to process the incoming requests received by the SIP signaling module and from the at least one access module to filter the requests according to the filtration criteria received from the applications and to pass the requests to at least one of the applications for which one or more of the filtration criteria are fulfilled;

said communications interface connecting the application processor with the at least one access module, said communications interface comprising:

a subscription/cancellation module that subscribes/cancels applications to events using the filtration criteria, which is connected to the event dispatcher so that the applications receive the events the applications require, to which the applications have previously subscribed;

an event notifying module sending each occurred event to each application subscribed to each event; and an action sending module, which action is directed to a single access module or to a single manager, to request the application processor to process an action by the at least one module or to a manager;

a content manager connected with said content specific protocol module that exchanges contents between an application of the application processor and the applications of other user terminals of user and services; and a profile manager connected to the ISIM module for the management of the public and private identities of the user of the one of the fixed and mobile user terminals and the sending of the events by the event dispatcher to each application of the application processor according to the identity associated to each event.

2. The system enabling IP (Internet Protocol) services for user terminals based on SIP (Session Initiation Protocol) signaling according to claim 1, wherein the application processor generates a filtration criterion for the subscription to each event required by each application; each filtration criterion comprising at least one identification of the application, a user profile comprising a public identity of the user, a priority, and selectively a trigger point comprising one to n service point triggers indicating the triggers produced by each event; where n is a positive integer.

3. The system enabling IP (Internet Protocol) services for user terminals based on SIP (Session Initiation Protocol) signaling according to claim 2, wherein the event dispatcher module comprises:

a filtration criteria loading/unloading submodule receiving the criteria through a subscription/cancellation module of the communications interface for the subscription/cancellation of the applications to the events they require;

a storage submodule that stores the received filtration criteria, which storage submodule groups filtrations criteria subsets having the same user profile in common and arranges them according to priorities;

a filtration logic submodule receiving the events, which events comprise at least one user profile and service point triggers, in order to process the event and check which trigger point complies with the filtration criteria of the event by order of priority and within its filtration criteria group assigned by the user profile; and a distributor submodule connected to the event notifying module of the communication interface, in order to send the events to each application fulfilling the filtration criterion.

4. The system enabling IP (Internet Protocol) services for user terminals based on SIP (Session Initiation Protocol)

signaling according to claim 2, wherein there cannot be two filtration criteria with the same priority for a single user profile.

5. The system enabling IP (Internet Protocol) services for user terminals based on SIP (Session Initiation Protocol) signaling according to claim 2, wherein the absence of trigger points in the filtration criterion indicates the unconditional sending of the event.

6. The system enabling IP (Internet Protocol) services for user terminals based on SIP (Session Initiation Protocol) signaling according to claim 1, wherein it comprises a plurality of access modules selected between a registration module that registers applications in IMS and IP networks to carry out the registration, deregistration and request of contacts associated to one or more identities of the user;
- a calling module that calls IP and IMS networks for the access of the application processor to the latter; an event registration module the application processor with access to the events of said IMS network;
- a presence module that provides the application processor with access to presence services; an instant messaging module that provides the application processor with access to the sending and receiving of messages both inside and outside a session;
- a capacity requesting module that requests the capacity of different nodes within an SIP signaling network to provide the application processor this type of requests; call information sending module that provides the application processor to this functionality;
- a service transfer module that transfers a service to provide the application processor with access to this function; and at least one generic module that extends the system functionality as the functionality of the SIP signaling module is extended.

7. A user terminal device that utilizes Internet Protocol (IP) services using Session Initiation Protocol (SIP) signaling in communications with an IP network accessible by the user terminal device, wherein the IP network is also communicatively connected through an IMS (Internet Multimedia Subsystem) network to at least one of: (i) other user terminal devices and (ii) services, the user terminal device comprising:
- an application processor processing a plurality of applications, each application including one or more filtration criteria used by the application processor to subscribe the application to events required by the application, the one or more filtration criteria being evaluated according to an order of priority associated with the filtration criteria;
- a Session Initiation Protocol (SIP) signaling module configured to interact with the other user terminal devices or the services using SIP requests; and
- an enabler module connected to, and arranged between, the application processor and the SIP signaling module to appropriately direct requests between the SIP signaling module and the application processor, the enabler module comprising:
    - a communications interface arranged and configured to communicate with the applications of the application processor;
    - at least one access module connected to, and arranged between, the SIP signaling module and the communications interface, wherein the at least one access module is configured to receive outgoing requests from the application processor through at least the communications interface and send the outgoing requests to the SIP signaling module, and is also configured to receive incoming requests from the SIP signaling module; and
    - an event dispatcher module connected to, and arranged between, the at least one access module and the communications interface, wherein the event dispatcher module is arranged and configured to process the incoming requests received by the SIP signaling module and from the at least one access module to filter the requests according to the filtration criteria received from the applications, and to pass the requests to at least one of the applications for which one or more of the filtration criteria are fulfilled.

* * * * *